(12) United States Patent
Zhang et al.

(10) Patent No.: US 8,808,418 B2
(45) Date of Patent: *Aug. 19, 2014

(54) LOW TEMPERATURE DIESEL PARTICULATE MATTER REDUCTION SYSTEM

(75) Inventors: Wenzhong Zhang, Savage, MN (US);
Todd R. Taubert, St. Paul, MN (US);
Timothy L. Ricke, Savage, MN (US);
Julian A. Imes, Bloomington, MN (US)

(73) Assignee: Donaldson Company, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,069

(22) Filed: Jul. 16, 2012

(65) Prior Publication Data
US 2013/0183215 A1 Jul. 18, 2013

Related U.S. Application Data

(60) Division of application No. 12/984,436, filed on Jan. 4, 2011, now abandoned, which is a continuation of application No. 11/725,578, filed on Mar. 19, 2007, now Pat. No. 7,862,640.

(60) Provisional application No. 60/784,621, filed on Mar. 21, 2006.

(51) Int. Cl.
*B01D 39/20* (2006.01)
*B01D 39/14* (2006.01)
*B01D 39/06* (2006.01)
*B01D 50/00* (2006.01)
*B01D 24/00* (2006.01)

(52) U.S. Cl.
USPC ............. 55/523; 55/522; 55/524; 422/169; 422/170; 422/171; 422/172; 422/177; 422/178; 422/179; 422/180; 422/181; 422/182

(58) Field of Classification Search
USPC ............ 55/522–524; 422/169–172, 177–182
See application file for complete search history.

(56) References Cited

U.S. PATENT DOCUMENTS

| 3,318,128 A | 5/1967 | Rhodes |
| 3,458,977 A | 8/1969 | Young et al. |

(Continued)

FOREIGN PATENT DOCUMENTS

| DE | 33 37 903 A1 | 5/1985 |
| DE | 35 45 762 A1 | 7/1987 |

(Continued)

OTHER PUBLICATIONS

"California enforcing NO₂ limits for diesel emission retrofits," http://www.dieselnet.com/news/2006/11arb.php, 1 page (Nov. 6, 2006).

(Continued)

*Primary Examiner* — Amber Orlando
(74) *Attorney, Agent, or Firm* — Merchant & Gould P.C.

(57) ABSTRACT

A system for treating diesel exhaust is disclosed. The system includes a first filter including layers of filtration material positioned between layers of corrugated metallic foil. The metallic foil defines a honeycomb arrangement of longitudinal passageways from an upstream end to a downstream end and also openings for allowing exhaust to pass between adjacent longitudinal passageways of the metallic foil. The filtration material is positioned such that exhaust between the adjacent longitudinal passageways passes through the filtration material. The metallic foil also includes flow diverting structures to divert flow within the longitudinal passageways through the openings. A second filter is positioned downstream from the first filter. The second filter defines a honeycomb arrangement of longitudinal passageways. The longitudinal passages are selectively plugged adjacent upstream and downstream ends to force flow radially through walls between the longitudinal passages of the second filter.

15 Claims, 11 Drawing Sheets

(56) References Cited

U.S. PATENT DOCUMENTS

| | | |
|---|---|---|
| 3,712,030 A | 1/1973 | Priest |
| 4,065,919 A | 1/1978 | Eknayan |
| 4,098,722 A | 7/1978 | Cairns et al. |
| 4,276,071 A | 6/1981 | Outland |
| 4,319,896 A | 3/1982 | Sweeney |
| 4,340,403 A | 7/1982 | Higuchi et al. |
| 4,346,557 A | 8/1982 | Shadman et al. |
| 4,372,111 A | 2/1983 | Virk et al. |
| 4,400,352 A | 8/1983 | Rehnberg et al. |
| 4,404,007 A | 9/1983 | Tukao et al. |
| 4,416,674 A | 11/1983 | McMahon et al. |
| 4,419,108 A | 12/1983 | Frost et al. |
| 4,449,362 A | 5/1984 | Frankenberg et al. |
| 4,451,441 A | 5/1984 | Ernest et al. |
| 4,462,812 A | 7/1984 | Bly et al. |
| 4,464,185 A | 8/1984 | Tomita et al. |
| 4,478,618 A | 10/1984 | Bly et al. |
| 4,485,621 A | 12/1984 | Wong et al. |
| 4,485,622 A | 12/1984 | Takagi et al. |
| 4,515,758 A | 5/1985 | Domesle et al. |
| 4,535,588 A | 8/1985 | Sato et al. |
| 4,625,511 A | 12/1986 | Scheitlin et al. |
| 4,652,286 A | 3/1987 | Kusuda et al. |
| 4,665,690 A | 5/1987 | Nomoto et al. |
| 4,686,827 A | 8/1987 | Wade et al. |
| 4,695,437 A | 9/1987 | Jung |
| 4,702,075 A | 10/1987 | Jenny |
| 4,813,233 A | 3/1989 | Vergeer et al. |
| 4,814,081 A | 3/1989 | Malinowski |
| 4,828,807 A | 5/1989 | Domesle et al. |
| 4,851,015 A | 7/1989 | Wagner et al. |
| 4,857,089 A | 8/1989 | Kitagawa et al. |
| 4,864,821 A | 9/1989 | Hoch |
| RE33,118 E | 11/1989 | Scheitlin et al. |
| 4,887,427 A | 12/1989 | Shinzawa et al. |
| 4,902,487 A | 2/1990 | Cooper et al. |
| 4,905,470 A | 3/1990 | Reichle et al. |
| 4,912,776 A | 3/1990 | Alcorn |
| 4,916,897 A | 4/1990 | Hayashi et al. |
| 4,934,142 A | 6/1990 | Hayashi et al. |
| 4,961,314 A | 10/1990 | Howe et al. |
| 4,980,137 A | 12/1990 | Nelson et al. |
| 5,065,574 A | 11/1991 | Bailey |
| 5,067,320 A | 11/1991 | Kanesaki |
| 5,076,821 A | 12/1991 | Bruhnke et al. |
| 5,082,479 A | 1/1992 | Miller |
| 5,089,237 A | 2/1992 | Schuster et al. |
| 5,094,075 A | 3/1992 | Berendes |
| 5,100,632 A | 3/1992 | Dettling et al. |
| 5,143,707 A | 9/1992 | Beck et al. |
| 5,157,007 A | 10/1992 | Domesle et al. |
| 5,169,604 A | 12/1992 | Crothers, Jr. |
| 5,207,990 A | 5/1993 | Sekiya et al. |
| 5,212,948 A | 5/1993 | Gillingham et al. |
| 5,240,485 A | 8/1993 | Haerle et al. |
| 5,243,819 A | 9/1993 | Woerner et al. |
| 5,248,482 A | 9/1993 | Bloom |
| 5,293,742 A | 3/1994 | Gillingham et al. |
| 5,322,537 A | 6/1994 | Nakamura et al. |
| 5,396,764 A | 3/1995 | Rao et al. |
| 5,426,936 A | 6/1995 | Levendis et al. |
| 5,489,319 A | 2/1996 | Tokuda et al. |
| 5,492,679 A | 2/1996 | Ament et al. |
| 5,522,218 A | 6/1996 | Lane et al. |
| 5,591,413 A | 1/1997 | Toyoda |
| 5,711,147 A | 1/1998 | Vogtlin et al. |
| 5,746,989 A | 5/1998 | Murachi et al. |
| 5,771,684 A | 6/1998 | Hertl et al. |
| 5,771,868 A | 6/1998 | Khair |
| 5,787,707 A | 8/1998 | Hertl et al. |
| 5,891,409 A | 4/1999 | Hsiao et al. |
| 5,908,480 A | 6/1999 | Ban et al. |
| 5,996,337 A | 12/1999 | Blosser et al. |
| 6,023,930 A | 2/2000 | Abe et al. |
| 6,119,448 A | 9/2000 | Emmerling et al. |
| 6,199,375 B1 | 3/2001 | Russell |
| 6,293,096 B1 | 9/2001 | Khair et al. |
| 6,294,141 B1 | 9/2001 | Twigg et al. |
| 6,316,121 B1 | 11/2001 | Maus |
| 6,325,834 B1 | 12/2001 | Fonseca et al. |
| 6,365,283 B1 | 4/2002 | Bruck |
| 6,427,436 B1 | 8/2002 | Allansson et al. |
| 6,484,495 B2 | 11/2002 | Minami |
| 6,516,611 B1 | 2/2003 | Schäfer-Sindlinger et al. |
| 6,534,021 B1 | 3/2003 | Maus |
| 6,546,721 B2 | 4/2003 | Hirota et al. |
| 6,557,340 B1 | 5/2003 | Twigg et al. |
| 6,582,490 B2 | 6/2003 | Miller et al. |
| 6,587,188 B2 | 7/2003 | Gleine et al. |
| 6,669,913 B1 | 12/2003 | Haberkamp |
| 6,673,136 B2 | 1/2004 | Gillingham et al. |
| 6,680,037 B1 | 1/2004 | Allansson et al. |
| 6,696,031 B1 | 2/2004 | Twigg et al. |
| 6,725,653 B2 | 4/2004 | Brown et al. |
| 6,742,331 B2 | 6/2004 | Minami |
| 6,753,294 B1 | 6/2004 | Brisley et al. |
| 6,766,641 B1 | 7/2004 | Surnilla et al. |
| 6,775,972 B2 | 8/2004 | Twigg et al. |
| 6,776,814 B2 | 8/2004 | Badeau et al. |
| 6,790,248 B2 | 9/2004 | Ishihara et al. |
| 6,805,849 B1 | 10/2004 | Andreasson et al. |
| 6,813,882 B2 | 11/2004 | Hepburn et al. |
| 6,813,884 B2 | 11/2004 | Shigapov et al. |
| 6,817,174 B1 | 11/2004 | Igarashi et al. |
| 6,827,909 B1 | 12/2004 | Bruck et al. |
| 6,829,891 B2 | 12/2004 | Kato et al. |
| 6,857,265 B2 | 2/2005 | Twigg et al. |
| 6,862,881 B1 | 3/2005 | Klingbeil et al. |
| 6,863,874 B1 | 3/2005 | Twigg |
| 6,877,313 B1 | 4/2005 | Phillips et al. |
| 6,889,498 B1 | 5/2005 | Chandler et al. |
| 6,892,529 B2 | 5/2005 | Duvinage et al. |
| 6,916,450 B2 | 7/2005 | Akama et al. |
| 6,928,806 B2 | 8/2005 | Tennison et al. |
| 6,966,179 B2 | 11/2005 | Onodera et al. |
| 6,973,776 B2 | 12/2005 | van Nieuwstadt et al. |
| 6,983,589 B2 | 1/2006 | Lewis et al. |
| 6,990,800 B2 | 1/2006 | van Nieuwstadt et al. |
| 7,000,384 B2 | 2/2006 | Kagenishi |
| 7,007,462 B2 | 3/2006 | Kitahara |
| 7,008,461 B2 | 3/2006 | Kuki et al. |
| 7,021,047 B2 | 4/2006 | Hilden et al. |
| 7,055,314 B2 | 6/2006 | Treiber |
| 7,078,004 B2 | 7/2006 | Voss et al. |
| 7,082,753 B2 | 8/2006 | Dalla Betta et al. |
| 7,111,453 B2 | 9/2006 | Chandler et al. |
| 7,128,772 B2 | 10/2006 | Brück |
| 7,141,226 B2 | 11/2006 | Twigg |
| 7,174,705 B2 | 2/2007 | Binder et al. |
| 7,178,331 B2 | 2/2007 | Blakeman et al. |
| 7,207,171 B2 | 4/2007 | Nagaoka et al. |
| 7,264,785 B2 | 9/2007 | Blakeman et al. |
| 7,267,805 B2 | 9/2007 | Bruck et al. |
| 7,340,888 B2 | 3/2008 | Zhang et al. |
| 7,404,933 B2 | 7/2008 | Twigg |
| 7,498,010 B2 | 3/2009 | Andreasson et al. |
| 7,862,640 B2 | 1/2011 | Zhang et al. |
| 2002/0053202 A1 | 5/2002 | Akama et al. |
| 2002/0170433 A1 | 11/2002 | Pfeifer et al. |
| 2003/0072694 A1 | 4/2003 | Hodgson et al. |
| 2003/0086837 A1 | 5/2003 | Bruck et al. |
| 2003/0095904 A1 | 5/2003 | Cheng |
| 2003/0097934 A1 | 5/2003 | Bruck et al. |
| 2004/0013579 A1 | 1/2004 | Schaller |
| 2004/0013580 A1 | 1/2004 | Bruck et al. |
| 2004/0175315 A1 | 9/2004 | Brisley et al. |
| 2004/0221572 A1 | 11/2004 | Treiber |
| 2005/0011186 A1 | 1/2005 | Saito et al. |
| 2005/0132674 A1 | 6/2005 | Toyoda et al. |
| 2005/0198942 A1 | 9/2005 | van Nieuwstadt et al. |
| 2005/0229590 A1 | 10/2005 | Bruck et al. |
| 2005/0232830 A1 | 10/2005 | Bruck |
| 2005/0274012 A1 | 12/2005 | Hodgson et al. |
| 2006/0080953 A1 | 4/2006 | Maus et al. |

(56) References Cited

U.S. PATENT DOCUMENTS

| | | |
|---|---|---|
| 2006/0117736 A1 | 6/2006 | Twigg |
| 2006/0130464 A1 | 6/2006 | Sun et al. |
| 2006/0185352 A1 | 8/2006 | Twigg |
| 2006/0236680 A1 | 10/2006 | Zhang et al. |
| 2006/0254258 A1 | 11/2006 | Blakeman et al. |
| 2006/0254263 A1 | 11/2006 | Allansson et al. |
| 2006/0254266 A1 | 11/2006 | Chandler et al. |
| 2006/0272317 A1 | 12/2006 | Brown et al. |
| 2007/0012031 A1 | 1/2007 | Tanimura et al. |
| 2008/0047244 A1 | 2/2008 | Zhang et al. |
| 2011/0185709 A1 | 8/2011 | Zhang et al. |

FOREIGN PATENT DOCUMENTS

| | | |
|---|---|---|
| DE | 37 44 265 A1 | 7/1989 |
| EP | 0 035 053 A1 | 9/1981 |
| EP | 0 160 482 A2 | 11/1985 |
| EP | 0 283 913 A2 | 9/1988 |
| EP | 0 160 482 B1 | 1/1989 |
| EP | 0 341 832 A2 | 11/1989 |
| EP | 0 369 163 A1 | 5/1990 |
| EP | 0 393 257 A1 | 10/1990 |
| EP | 0 628 706 A2 | 12/1994 |
| EP | 0 341 832 B1 | 1/1996 |
| EP | 0 758 713 A1 | 2/1997 |
| EP | 0 798 452 A1 | 10/1997 |
| EP | 1 055 805 A1 | 11/2000 |
| EP | 1 054 722 B1 | 12/2001 |
| EP | 1 251 249 A2 | 10/2002 |
| EP | 1 060 004 B2 | 2/2006 |
| EP | 1 251 249 B1 | 6/2006 |
| FR | 2 860 837 A1 | 4/2005 |
| GB | 1 014 498 | 12/1965 |
| GB | 1 301 667 | 1/1973 |
| GB | 1 557 780 | 12/1979 |
| GB | 2 188 559 A | 10/1987 |
| JP | 57-117326 | 7/1982 |
| JP | 59-150918 | 8/1984 |
| JP | 60-43113 | 3/1985 |
| JP | 61-112716 | 5/1986 |
| JP | 64-8311 | 1/1989 |
| JP | 5-195756 | 8/1993 |
| JP | 6-50134 | 2/1994 |
| JP | 6-294316 | 10/1994 |
| JP | 7-119444 | 5/1995 |
| JP | 8-42329 | 2/1996 |
| JP | 8-49533 | 2/1996 |
| JP | 8103636 | 4/1996 |
| JP | 8-266868 | 10/1996 |
| JP | 9-79024 | 3/1997 |
| JP | 9-88569 | 3/1997 |
| JP | 2001-82133 | 3/2001 |
| JP | 2001-295627 | 10/2001 |
| JP | 2001-355431 | 12/2001 |
| WO | WO 90/12950 | 11/1990 |
| WO | WO 91/10048 | 7/1991 |
| WO | WO 99/44725 | 9/1999 |
| WO | WO 00/03790 | 1/2000 |
| WO | WO 01/92692 A1 | 12/2001 |
| WO | WO 2004/094045 | 4/2004 |
| WO | WO 2004/047952 A2 | 6/2004 |
| WO | WO 2004/050219 A1 | 6/2004 |
| WO | WO 2004/072446 A1 | 8/2004 |
| WO | WO 2005/005797 A2 | 1/2005 |

OTHER PUBLICATIONS

"CRT Filter," *DieselNet Technology Guide*, pp. 1-5 (Mar. 15, 2001).

"Innovations," http://www.emitec.com/index.php?lang=en&mid=e4&doc=50, 14 pages (Date Printed Nov. 13, 2006).

"Proposed Amendments to the Verification Procedure for In-Use Strategies to Control Emissions from Diesel Engines," *California Environmental Protection Agency, Air Resources Board*, pp. 1-29 (Oct. 24, 2003).

Cooper, B. et al., "Role of NO in Diesel Particulate Emission Control," *SAE 1989 Transactions Journal of Engines*, Section 3, vol. 98, pp. 612-624 (Copyright 1990).

Enga, B. et al., "Catalytic Control of Diesel Particulate," *SAE 1982 Transactions*, Section 1, vol. 91, pp. 767-795 (1982).

Engler, B. et al., "Catalytically Activated Diesel Particulate Traps—New Development and Applications," *SAE Technical Paper Series*, No. 860007, pp. 1-10 (1986).

Hawker, P. et al., "Experience with a New Particulate Trap Technology in Europe," *Diesel Exhaust Aftertreatment 1997*, pp. 41-57 (Feb. 1997).

Hilliard, J. et al., "Nitrogen Dioxide in Engine Exhaust," *SAE Technical Paper Series*, No. 790691, 15 pages (1979).

International Search Report and Written Opinion issued for PCT Patent Application No. PCT/US2007/006971 mailed Sep. 14, 2007 (16 pages).

Kiyota, Y. et al., "Development of Diesel Particulate Trap Oxidizer System," *SAE Technical Paper Series*, No. 860294, pp. 203-213 (1986).

Klein, H. et al., "Diesel Particulate Emissions of Passenger Cars—New Insights into Structural Changes During the Process of Exhaust Aftertreatment Using Diesel Oxidation Catalysts," *SAE Technical Paper Series*, pp. 1-12 (Feb. 23-26, 1998).

Lafyatis, D. et al., "Ambient Temperature Light-off Aftertreatment System for Meeting ULEV Emission Standards," *SAE Technical Paper Series*, pp. 1-5 (Feb. 23-26, 1998).

Office Action issued for EP Patent Application No. 07753586.2 mailed Feb. 20, 2009 (4 pages).

Office Action issued for EP Patent Application No. 07753586.2 mailed Sep. 23, 2009 (6 pages).

Response to Feb. 20, 2009 Office Action for EP Patent Application No. 07753586.2 filed Jun. 4, 2009 (15 pages).

Response to Sep. 23, 2009 Office Action for EP Patent Application No. 07753586.2 filed Mar. 24, 2010 (12 pages).

Tuenter, G. et al., "Kinetics and Mechanism of the $NO_x$ Reduction with $NH_3$ on $V_2O_5$—$WO_3$—$TiO_2$ Catalyst," *Ind. Eng. Chem. Prod. Res. Dev.*, vol. 25, No. pp. 633-636 (1986).

Westerholm, R. et al., "Chemical Analysis and Biological Testing of Emissions from a Heavy Duty Diesel Truck With and Without Two Different Particulate Traps," *SAE Technical Paper Series*, No. 860014, pp. 73-83 (1986).

Wiedemann, B. et al., "Vehicular Experience with Additives for Regeneration of Ceramic Diesel Filters," *SAE Technical Paper Series*, No. 850017, pp. 3-21 (1985).

Zelenka, P. et al., "Worldwide diesel emission standards, current experiences and future needs," *Applied Catalysis B: Environmental*, vol. 10, pp. 3-28 (1996).

LOW TEMPERATURE DIESEL PARTICULATE MATTER REDUCTION SYSTEM

CROSS-REFERENCE TO RELATED APPLICATIONS

This application is a divisional application of U.S. patent application Ser. No. 12/984,436, filed Jan. 4, 2011, which is a continuation of U.S. patent application Ser. No. 11/725,578, filed Mar. 19, 2007, now issued as U.S. Pat. No. 7,862,640, which claims the benefit of U.S. Provisional Patent Application Ser. No. 60/784,621, filed Mar. 21, 2006, which applications are hereby incorporated by reference in their entireties.

TECHNICAL FIELD

The present disclosure relates generally to diesel engine exhaust systems. More particularly, the present disclosure relates to systems and methods for controlling diesel engine exhaust emissions.

BACKGROUND

Diesel engine exhaust contains particulate matter, the emission of which is regulated for environmental and health reasons. This particulate matter generally constitutes a soluble organic fraction ("SOF") and a remaining portion of hard carbon. The soluble organic fraction may be partially or wholly removed through oxidation in an oxidation catalyst device such as a catalytic converter; however, this typically results in a reduction of only about 20 percent of total particulate emissions. Thus, vehicles equipped with diesel engines may include diesel particulate filters for more completely removing the particulate matter from the exhaust stream, including the hard carbon portion. Conventional wall flow type diesel particulate filters may have particulate removal efficiencies of about 85 percent. However, diesel particulate filters, particularly those that have relatively high particulate filtration efficiency, are generally associated with high back pressures because of the restriction to flow through the filter. Further, with use, soot or other carbon-based particulate matter accumulates on the diesel particulate filters causing the buildup of additional undesirable back pressure in the exhaust systems. Engines that have large particulate mass emission rates may develop excessive back pressure levels in a relatively short period of time. High back pressures decrease engine efficiency and reduce engine performance. Therefore, it is desired to have diesel particulate filtration systems that minimize back pressure while capturing a high percentage of the particulate matter in the exhaust.

Conventional wall flow diesel particulate filters (DPFs) are high particulate removal efficiency filters that include a porous-walled honeycomb substrate (i.e., monolith) with channels that extend generally from an upstream end to a downstream end of the substrate. Generally half the channels are plugged adjacent the downstream end of the substrate and the other half of the channels are plugged adjacent the upstream end of the substrate. This plugged configuration forces exhaust flow to pass radially through the porous walls defining the channels of the substrate in order to exit the diesel particulate filter.

To prevent diesel particulate filters from becoming excessively loaded with particulate matter, it is necessary to regenerate the diesel particulate filters by burning off (i.e., oxidizing) the particulates that accumulate on the filters. It is known to those of skill in the art that one method by which particulate matter may be oxidized is to raise the temperature of the exhaust gas sufficiently to allow the excess oxygen in the exhaust gas to oxidize the particulate matter. Also well-known to those of skill in the art is that particulate matter may be oxidized at a lower temperature in the presence of sufficient amounts of nitrogen dioxide ($NO_2$).

Diesel exhaust inherently contains nitrogen oxides ($NO_x$), which consist primarily of nitric oxide (NO) and nitrogen dioxide ($NO_2$). Typically, the $NO_2$ inherently present in the exhaust stream is a relatively small percentage of total $NO_x$, such as in the range of 5 to 20 percent but usually in the range of 5 to 10 percent. Although some regeneration of a diesel particulate filter occurs at such levels, it is insufficient to result in complete regeneration. The effectiveness of $NO_2$ in regenerating a particulate filter depends in part on the ratio of $NO_x$ to particulate matter in the exhaust stream. Generally, the reaction of "$2NO_2+C=CO_2+2NO$" requires 8 times $NO_2$ per unit of C in mass.

To promote full regeneration, it is often necessary to increase the quantity of $NO_2$ in the exhaust stream. This is particularly true where the $NO_x$/particulate ratio is relatively small. One method to produce sufficient quantities of $NO_2$ is to use an oxidation catalyst to oxidize a portion of the NO present in the exhaust stream to $NO_2$. For example, a catalytic converter including a diesel oxidation catalyst can be positioned upstream from the diesel particulate filter and/or the diesel particulate filter itself can include a diesel oxidation catalyst. However, these types of prior art arrangements may result in excessive $NO_2$ emissions.

SUMMARY

One aspect of the present disclosure relates to a system for reducing particulate material emissions in diesel engine exhaust. In one embodiment, the system is adapted to optimize the use of $NO_2$ to remove particulate matter (PM) from the exhaust stream and to passively regenerate a diesel particulate filter that is a part of the system.

Another aspect of the present disclosure relates to a diesel particulate filtration system that at least one upstream filter to optimize the $NO_2$ to PM ratio at a downstream filter. In one embodiment, the upstream filter is a catalyzed flow-through filter, and the downstream filter is a catalyzed wall flow filter.

Examples representative of a variety of inventive aspects are set forth in the description that follows. The inventive aspects relate to individual features as well as combinations of features. It is to be understood that both the forgoing general description and the following detailed description merely provide examples of how the inventive aspects may be put into practice, and are not intended to limit the broad spirit and scope of the inventive aspects.

DETAILED DESCRIPTION

At relatively low temperatures (e.g., 200 to 350° C.), $NO_2$ molecules are typically more active for combusting soot than $O_2$. $NO_2$ reacts with soot according to the following reaction: $2NO_2+C=CO_2+2NO$. This reaction requires 8 times more $NO_2$ per unit of C in mass. The $NO_2$/PM ratio is a significant factor to boost this reaction.

One way to increase the $NO_2$/PM ratio at a filter is to decrease the PM on the filter rather than increase the concentration of $NO_2$ at the filter. To achieve this goal, a combination of an upstream filter and a downstream filter can be used. The upstream filter can have a lower filtration efficiency than the filtration efficiency of the downstream filter. In one embodiment, the upstream filter includes a flow-through filter (FTF), and the downstream filter includes a wall flow filter. The system preferably optimizes the $NO_2$/PM ratio on both filters such that an optimum amount of $NO_2$ is generated. Preferably, the system allows for the effective passive regeneration of the downstream filters at relatively low temperatures thereby preventing plugging of the downstream filter, and also minimizes the concentration of $NO_2$ that exits the tailpipe.

Flow-through filters partially intercept solid PM particles in exhaust. Some flow-through filters may exhibit a filtration efficiency of 50% or less. As discussed above, in accordance with the disclosure, while the first staged filter may be an FTF, the downstream filter may be a wall-flow filter. The wall-flow filter may have a filtration efficiency of at least 75% or higher. Both filters may be catalyzed to remove and oxidize HC, CO, and PM. Because of the flow-through nature, a portion of PM is intercepted in the first filter and the rest of the PM passes to the downstream high efficiency filter. The catalyst on the FTF may be chosen to just oxidize a selected portion of NO coming from engine exhaust to $NO_2$. Then, a portion of the $NO_2$ can be used to oxidize captured PM, transferring the used $NO_2$ back to NO, which can be reused by catalyst inside the filter downstream before being released.

The second filter may be catalyzed in such a way that the $NO_2$ being left over from the first filter and $NO_2$ being generated at the front section may be consumed by the captured soot at the middle and rear section of the second filter. The configuration of the system, including the design of the first filter to achieve a desired filtration efficiency and oxidation ability, allows the tailpipe $NO_2/NO_x$ ratio to be reduced to levels to meet California Air Resource Board Regulation.

Prior art systems have used a straight channel catalytic converter positioned upstream from a wall flow filter to increase the concentration of $NO_2$ at the wall flow filter. The present disclosure teaches using a flow-through filter upstream of the wall flow filter instead of a straight channel catalytic converter. Flow-through filters provide a number of advantages over catalytic converters. For example, flow-through filters provide higher residence times to allow locally generated $NO_2$ to react with a larger portion of PM (including both soluble organic fractions and hard carbon constituents) coming from engine. This decreases the PM portion that enters the down stream filter and increases $NO_2$/PM ratio inside the downstream filter. By optimizing the $NO_2$/PM ratio, the downstream filter is boosted to work efficiently at lower temperatures. In contrast, catalytic converter systems typically use a heavily catalyzed catalytic converter upstream of a catalyzed DPF. Such a catalytic converter can consume soluble fraction of particulate matters, but does not affect the concentration of hard carbon soot in the exhaust. Thus, multistage filtration with a catalyzed flow through pre-filter followed by a catalyzed DPF is a better solution with maximized soot-$NO_2$ residence time and minimized $NO_2$ emissions at the tailpipe.

In certain embodiments, the combination of the FTF and the DPF may lead to a filtration efficiency of higher than 92% and $NO_2/NO_x$ ratio on a CAT 3126 engine over FTP cycle to 28% which may exhibit a 20% increase of $NO_2/NO_x$ percentage across the device from the engine out $NO_2/NO_x$ level. Such a device may improve PM filtration efficiency and reduce the system-out $NO_2$ to meet CARB $NO_2$ rule. The primary PM reduction from the FTF can increase the $NO_x$/PM ratio inside the downstream DPF, hence the captured soot oxidized at a relatively lower temperature, leading to lower application criteria.

Figure 1:
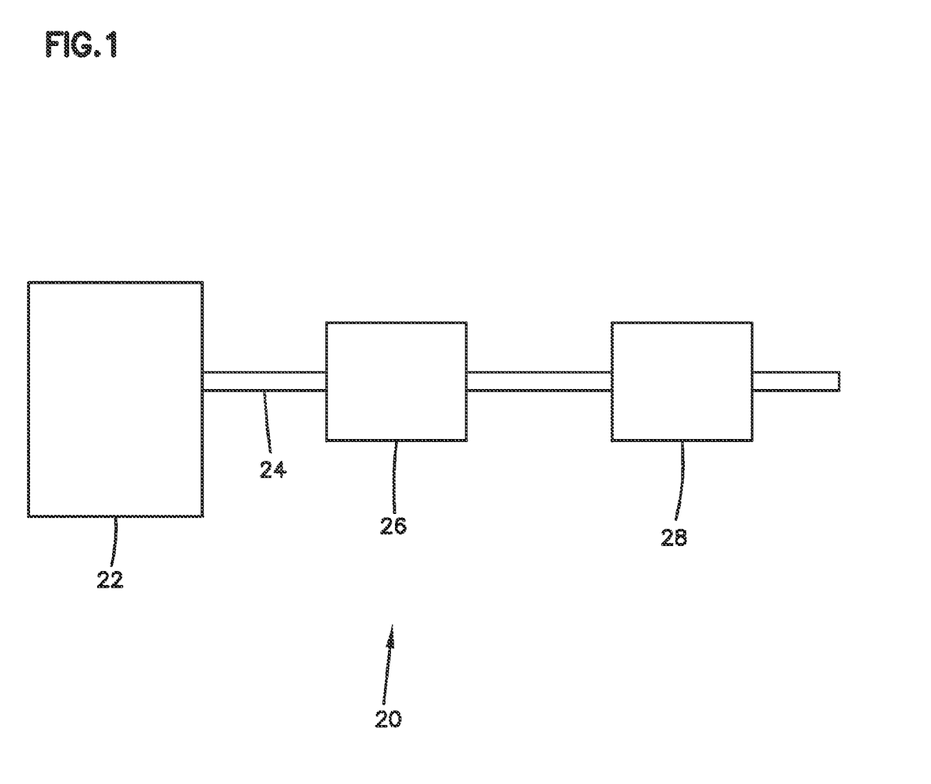
FIG. 1 schematically illustrates an exhaust system having features that are examples of inventive aspects in accordance with the principles of the present disclosure.
Figure 2:
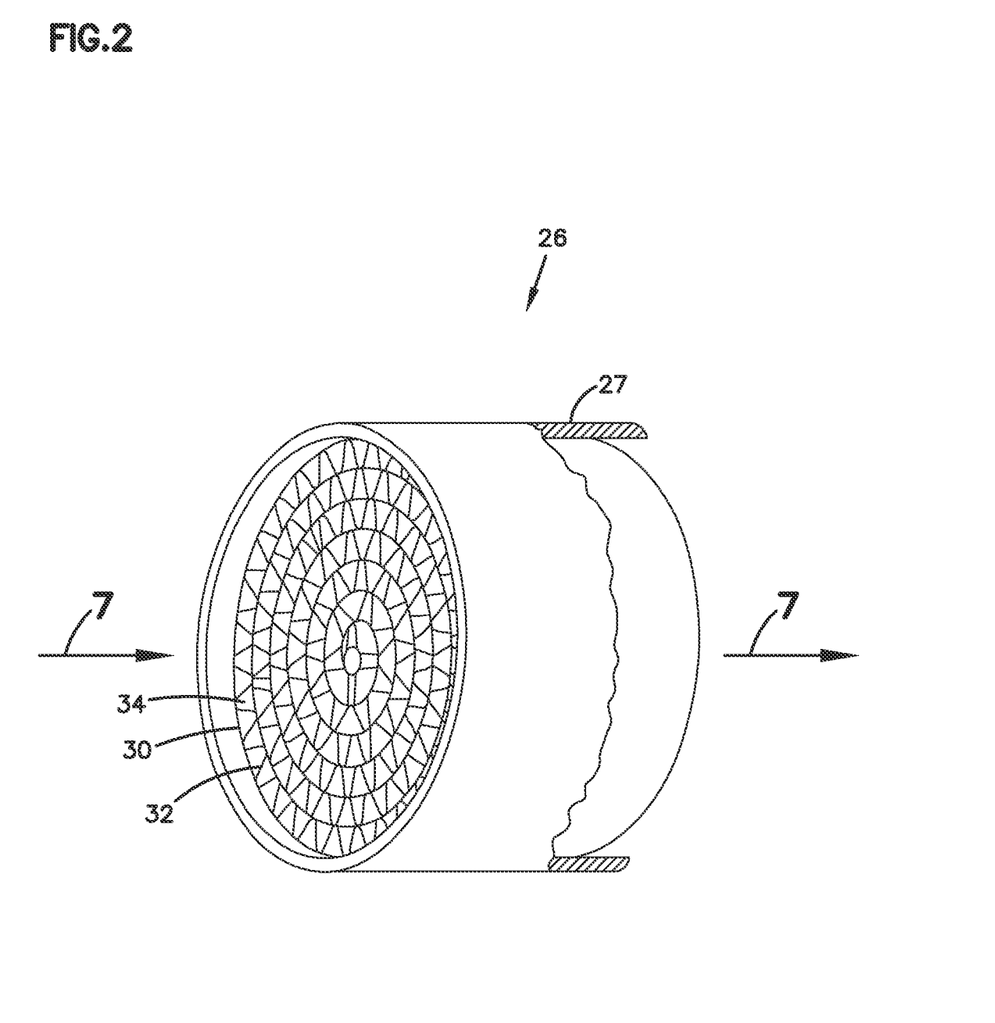
FIG. 2 illustrates an example flow-through filter that can be used as an upstream filter in the system of FIG. 1.
Figure 3:
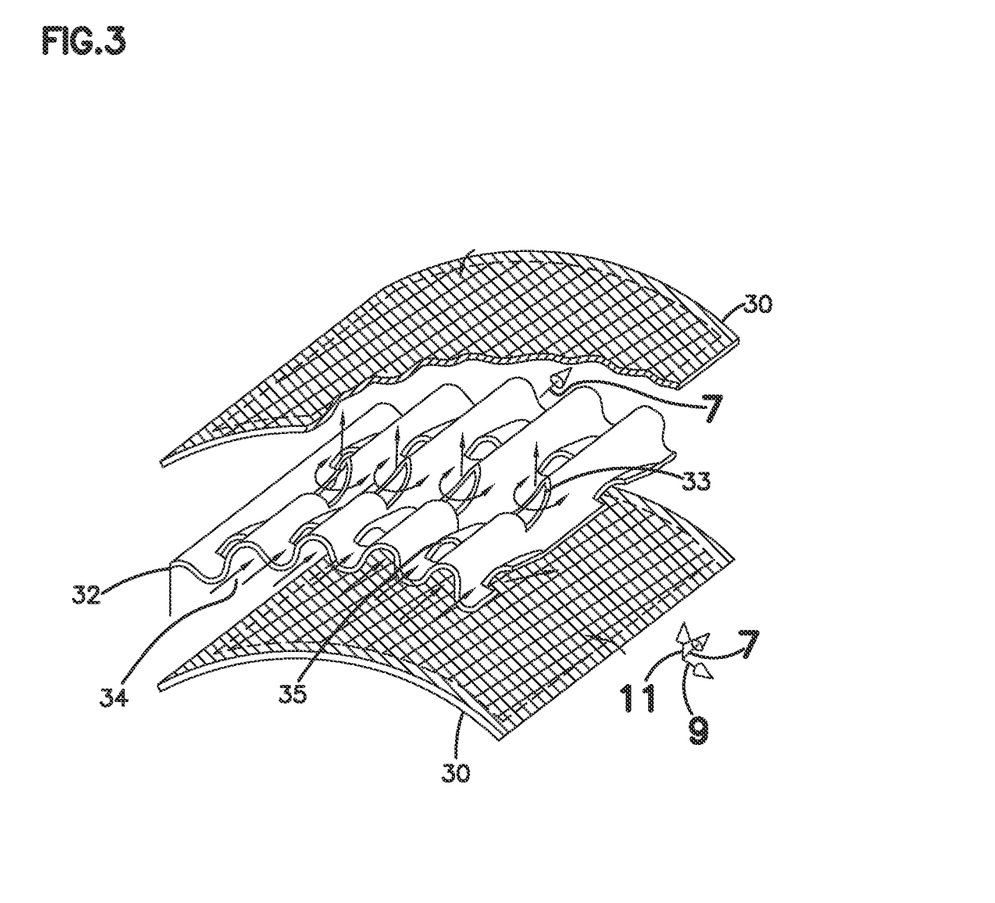
FIG. 3 illustrates an enlarged, exploded view of a portion of the filter of FIG. 2.
Figure 4:
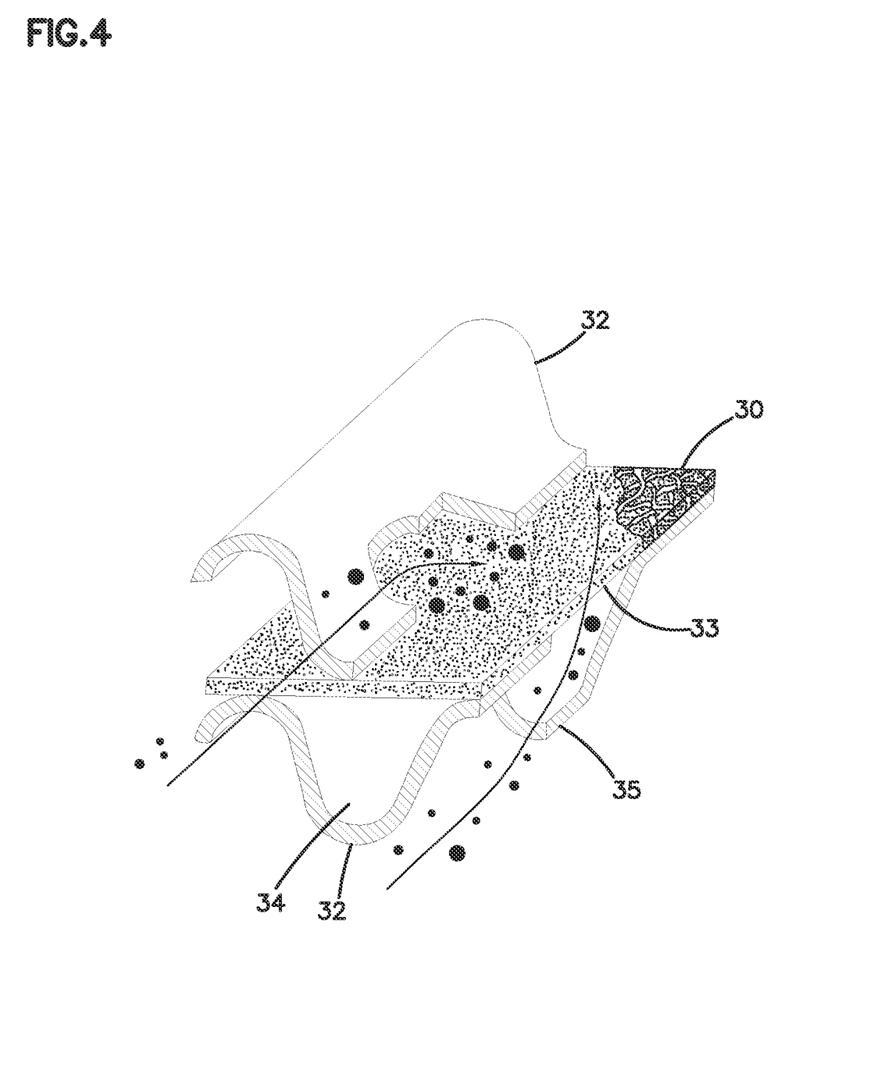
FIG. 4 illustrates a further enlarged, exploded view of a portion of the filter of FIG. 2.

FIG. 1 illustrates an exhaust system 20 that is in accordance with inventive aspects of the present disclosure. The system includes an engine 22 (e.g., a diesel engine) and an exhaust conduit 24 for conveying exhaust gas away from the engine 22. A first diesel particulate reduction device 26 is positioned in the exhaust stream. Downstream from the first diesel particulate reduction device 26 is a second diesel particulate reduction device 28. It will be appreciated that the first diesel particulate reduction device 26 and the second diesel particulate reduction device 28 function together to treat the exhaust gas that passes through the conduit 24. It will also be appreciated that the first diesel particulate reduction device 26 and the second diesel particulate reduction device 28 may be separated by any distance, including being positioned in close proximity or even in direct contact.

The first diesel particulate device 26 is preferably a flow-through filter. Flow-through filters are filters that typically have moderate particulate mass reduction efficiencies. For purposes of this specification, particulate mass reduction efficiency is determined by subtracting the particulate mass that enters the filter from the particulate mass that exits the filter, and by dividing the difference by the particulate mass that enters the filter. The test duration and engine cycling during testing are preferably determined by the Federal Test Procedure (FTP) heavy-duty transient cycle that is currently used for emission testing of heavy-duty on-road engines in the United States (see CFR Title 40, Part 86.1333). A typical flow-through filter has a particulate mass reduction efficiency of 50 percent or less.

Certain flow-through filters do not require all of the exhaust gas traveling through the filter to pass through a filter media having a pore size sufficiently small to trap particulate material. One embodiment of a flow-through filter includes a plurality of flow-through channels that extend longitudinally from the entrance end to the exit end of the flow-through filter. The flow-through filter also includes filter media that is positioned between at least some of the flow-through channels. The filter further includes flow diversion structures that generate turbulence in the flow-through channels. The flow diversion structures also function to divert at least some exhaust flow from one flow-through channel to another flow-through channel. As the exhaust flow is diverted from one flow-through channel to another, the diverted flow passes through the filter media causing some particulate material to be trapped within the filter media. This flow-through-type filter yields moderate filtration efficiencies, typically up to 50% per filter, with relatively low back pressure.

A catalyst coating (e.g., a precious metal coating) can be provided on the flow-through channels of the flow-through filter to promote the oxidation of the soluble organic fraction (SOF) of the particulate matter to gaseous components and to promote the oxidation of a portion of the nitric oxide (NO) within the exhaust gas to nitrogen dioxide ($NO_2$). Furthermore, the filter media of the flow-through filter captures a portion of the hard carbon particulate matter and a portion of the non-oxidized SOF present in the exhaust. A portion of the net $NO_2$ present, comprising the combination of the $NO_2$ generated by the oxidation catalyst and the $NO_2$ inherently present in diesel exhaust, reacts with the particulate matter trapped on the filter media, according to the reaction $NO_2+C=CO$ (or $CO_2$)+NO. In doing so, the solid particulate matter is converted to a gas, which flows out of the particulate reduction device. To enhance to combustion of carbon at the filter media, the filter media can also be coated with a catalyst (e.g., a precious metal such as platinum).

Figure 5:
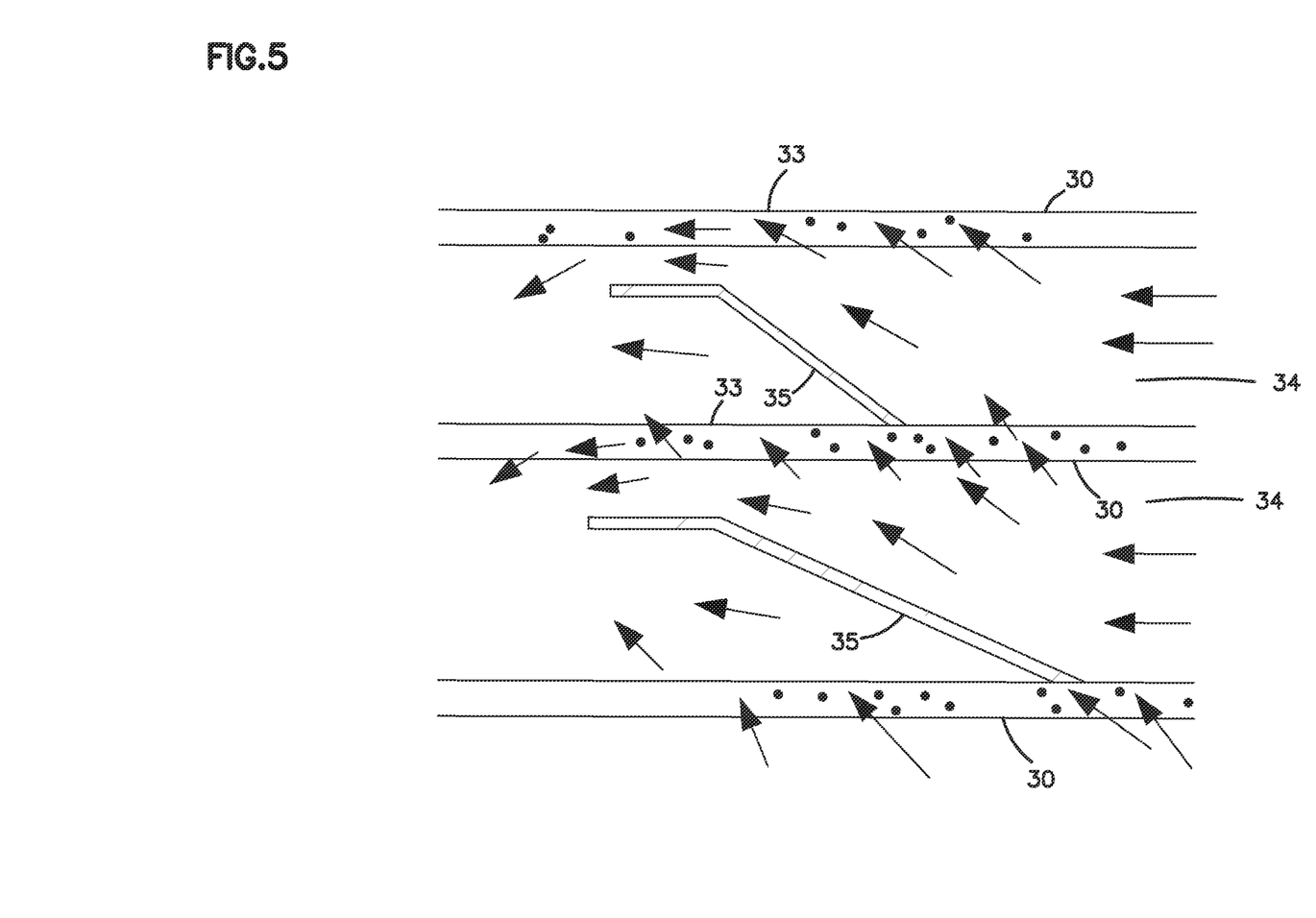
FIG. 5 is a schematic representation showing the operation of the filter of FIG. 2.

The first diesel particulate reduction device 26 can also be referred to as an upstream diesel particulate reduction device 26. An example upstream diesel particulate reduction device 26 is shown at FIGS. 2-5. The device 26 includes a canister 27 housing a substrate (e.g., a honeycomb body) constructed from multiple layers of filtration material 30 sandwiched between layers of corrugated metallic foil 32. The corrugated metallic foil 32 defines elongated passageways 34 (i.e., channels) that are generally parallel to a net flow direction 7 of exhaust gases through the particulate reduction device. The metallic foil 32 preferably includes structures that generate turbulence for ensuring that mixing occurs within the substrate. In the depicted embodiment, the structures include openings 33 and flow diverting surfaces 35 (i.e., mixing surfaces, deflecting surfaces, mixing shovels, flow diversion structures or like terms). The flow diverting surfaces 35 cause some flow to be diverted within the passageways 34 from the net flow direction 7 to transverse directions 9 and radial directions 11. At least some of the diverted flow travels through the openings 33 between adjacent passageways 34 and through the filtration material 30. As the exhaust flow travels through the filtration material 30, at least some particulate material of the exhaust stream is captured by the filtration material 30. As shown at FIG. 5, the diverting surfaces 35 do not completely block/plug the passageways 34. This assists in keeping the pressure drop across the device 26 relatively low.

In one embodiment, the filtration material 30 is a woven-type material constructed from metallic fibers (e.g., a metallic fabric or fleece) which capture particles both by impingement and by blocking their flow. The particle-blocking properties of the filtration material 30 are determined in part by the diameter of the metallic fibers used to construct the fleece. For example, metallic fibers of 20 to 28 microns (millionths of a meter) and 35 to 45 microns have been found to work acceptably. As the exhaust gases flow out of the foil 32 and into the filtration material 30, significant internal turbulence is induced. Of course, types of filtration material other than metallic fleece could also be used In one embodiment, the device 26 has a diameter of about 10.5 inches and a length of about 3 inches, with 200 cpsi. In certain embodiments, the residence time of the device 26 can be at least 10% or 15% greater than the residence time of a standard straight channel flow-through catalytic converter having the same space velocity.

The space velocity (i.e., the volumetric flow rate of the exhaust gas divided by the volume of the particulate reduction device) of the upstream particulate removal device 26 is greater than the space velocity of the downstream particulate removal device 28. In certain embodiments, the space velocity of the upstream particulate reduction device is equal to at least 2, 3 or 4 times the space velocity of the downstream particulate reduction device for a given volumetric flow rate. In other embodiments, the space velocity of the upstream particulate reduction device is equal to 2-6 or 3-5 times the space velocity of the downstream particulate reduction device for a given volumetric flow rate. In still other embodiments, the device 26 can have a particulate mass reduction efficiency of 15-50 percent or 20-50 percent.

In a preferred embodiment, the first diesel particulate reduction device 26 is manufactured by Emitec Gmbh and sold under the name "PM Kat." The device 26 may, however, comprise any flow-through-type construction known to those of skill in the art, such as wire mesh, metallic or ceramic foam. Further details relating to the constructions of the Emitec filters suitable for use as upstream filters can be found at U.S. Patent Application Publication Numbers US 2005/0232830, US 2005/0274012 and US 2005/0229590, which are hereby incorporated by reference in their entireties.

The upstream diesel particulate reduction device 26 also contains a catalyst coating adapted to promote the oxidation of hydrocarbons and the conversion of NO to $NO_2$. Exemplary catalyst coatings include precious metals such as platinum, palladium and rhodium, and other types of components such as alumina, cerium oxide, base metal oxides (e.g., lanthanum, vanadium, etc,) or zeolites. A preferred catalyst for the first particulate reduction device 26 is platinum with a loading level greater than 50 grams/cubic foot of substrate. In other embodiments the platinum loading level is in the range of 50-100 grams/cubic foot of substrate. In a preferred embodiment, the platinum loading is about 70 grams/cubic foot.

In a preferred embodiment, the catalyst coating is available from Intercat, Inc.

In one embodiment, the device 26 may exhibit a 27% PM reduction efficiency. In one embodiment, the $NO_2/NO_x$ ratio at the out end of the device 26 on a CAT 3126 engine over FTP cycle is around 32%.

Figure 6:
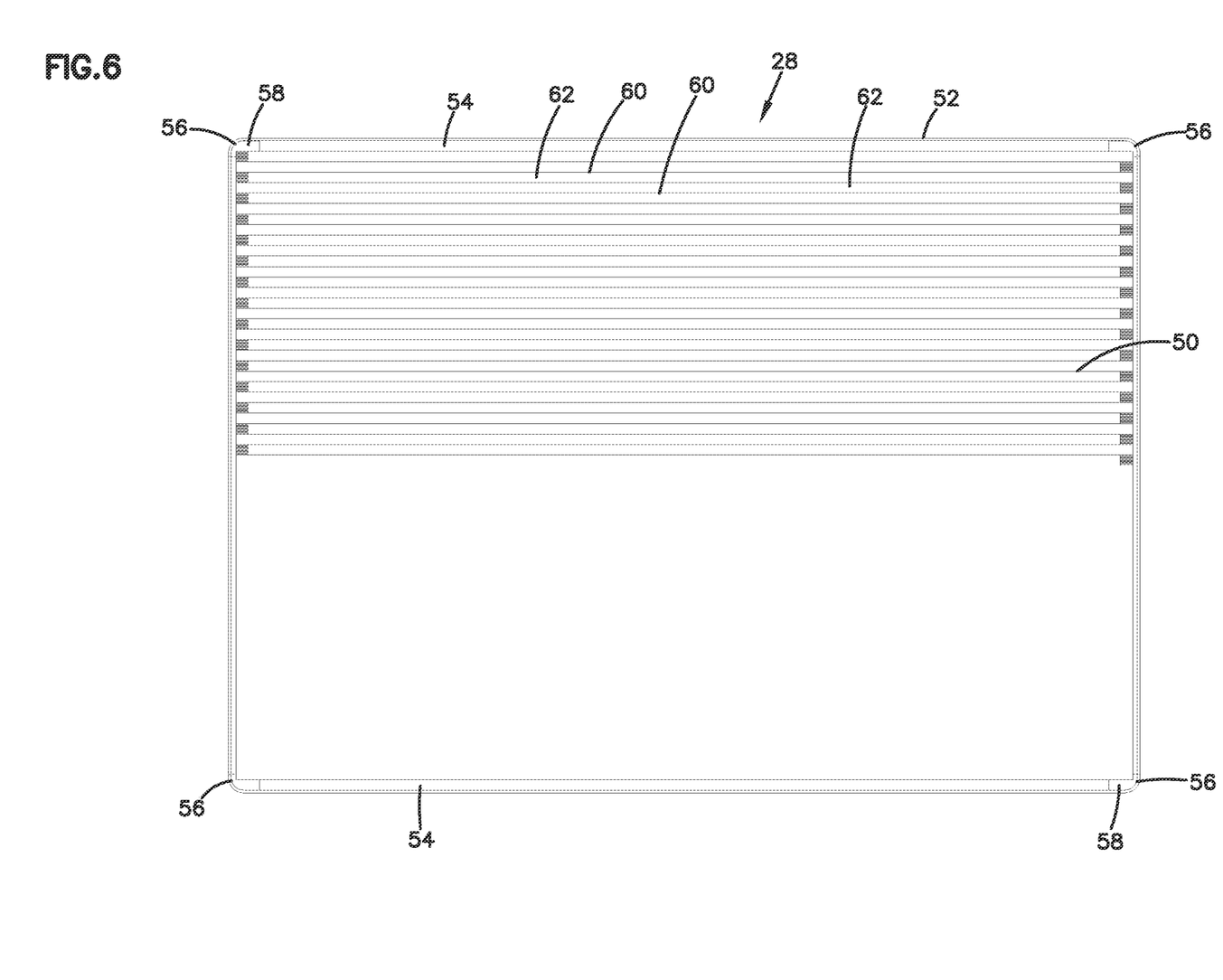
FIG. 6 is a cut-away view of an example wall flow filter that can be used as the downstream filter in the system of FIG. 1.

The second diesel particulate reduction device 28, also called the downstream diesel particulate reduction device 28, can have a variety of known configurations. As shown at FIG. 6, the device 28 is depicted as a wall-flow filter having a substrate 50 housed within an outer casing 52. In certain embodiments, the substrate 50 can have a ceramic (e.g., a foamed ceramic) monolith construction. A mat layer 54 can be mounted between the substrate 50 and the casing 52. Ends 56 of the casing can be bent radially inwardly to assist in retaining the substrate 50 within the casing 52. End gaskets 58 can be used to seal the ends of the device 28 to prevent flow from passing through the mat to by-pass the substrate 50.

In one embodiment, the device 28 has a diameter of about 10.5 inches and a length of about 12 inches, with 200 cpsi/12 mil.

Figure 7:
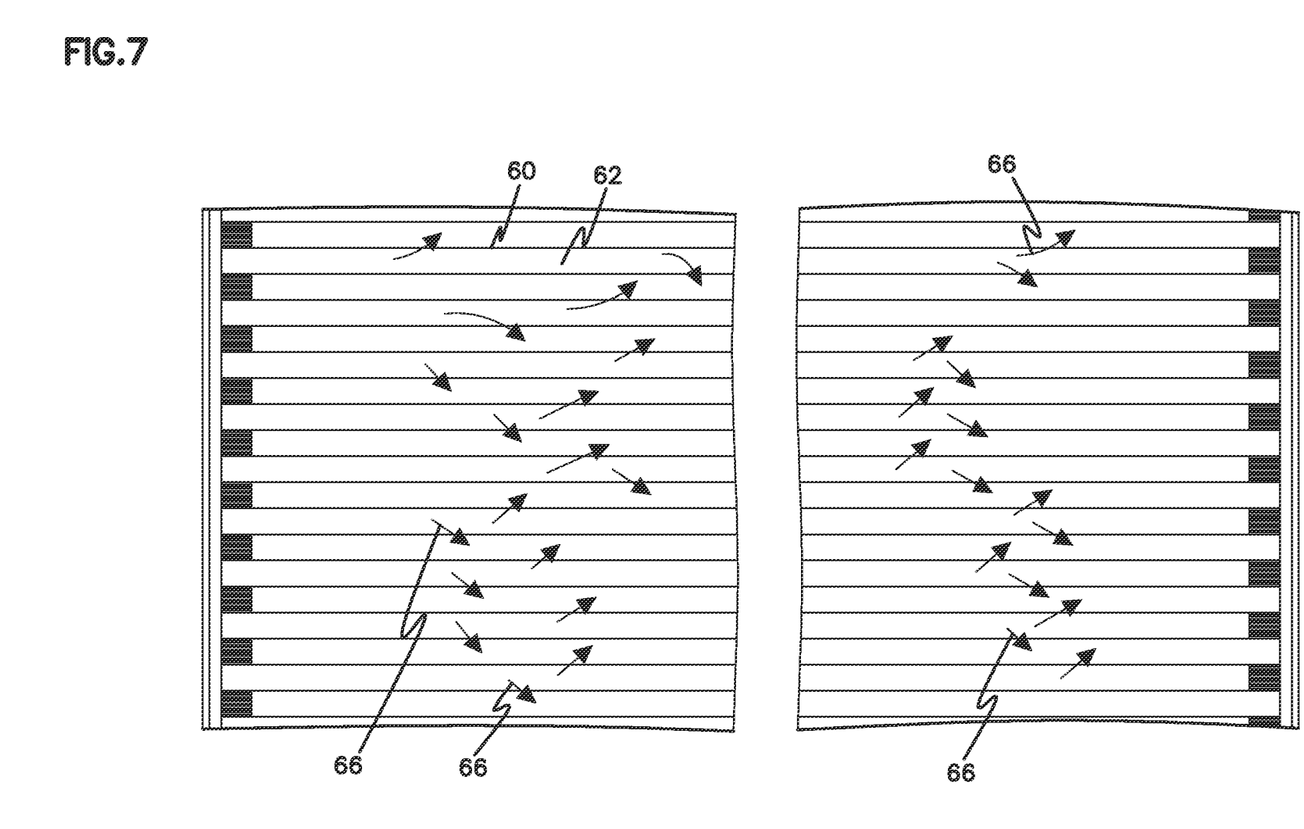
FIG. 7 is an enlarged portion of FIG. 6.

Referring to FIG. 6, the substrate 50 includes walls 60 defining a honeycomb arrangement of longitudinal passages 62 (i.e., channels) that extend from a downstream end 63 to an upstream end 64 of the substrate 50. The passages 62 are selectively plugged adjacent the upstream and downstream ends 63, 64 such that exhaust flow is forced to flow radially through the walls 60 between the passages 62 in order to pass through the device 28. As shown at FIG. 7, this radial wall flow is represented by arrows 66.

An example diesel particulate reduction device is a wall-flow filter having a monolith ceramic substrate including a "honey-comb" configuration of plugged passages as described in U.S. Pat. No. 4,851,015 that is hereby incorporated by reference in its entirety. Example materials for manufacturing the substrate 50 include cordierite, mullite, alumina, SiC, refractory metal oxides, or other materials conventionally used as catalyzed substrates. In a preferred embodiment, the device 28 includes a diesel particulate filter sold by Engelhard Corporation under the name "DPX Filter."

In certain embodiments, the substrate 50 can be coated a catalyst. Exemplary catalysts include precious metals such as platinum, palladium and rhodium, and other types of components such as base metal oxides or rare earth metal oxides. In certain embodiments, the substrate 50 has a platinum loading of 30-80 grams per cubic foot. In a preferred embodiment, the substrate 50 has a platinum loading of about 50 grams per cubic foot. In another embodiment of the diesel particulate reduction device 28, the substrate 50 may have a precious metal loading of about 25 grams per cubic foot, wherein the filter is coated substantially uniformly throughout its length. In one embodiment of the diesel particulate device 28, the substrate 50 may have a precious metal loading between about 5 and 35 grams per cubic foot, wherein the filter is coated substantially uniformly throughout its length.

The upstream particulate reduction device 26 preferably has a higher precious metal loading than the downstream particulate reduction device 28. In certain embodiments, the precious metal loading of the upstream device 26 is at least 10 percent, 20 percent, 30 percent or 40 percent higher than the precious metal loading of the downstream device 28. In other embodiments, the precious metal loading of the upstream device 26 is in the range of 10-80 percent, 20-60 percent or 30-50 percent higher than the precious metal loading of the downstream device 28.

In certain embodiments, catalyst coating of the substrate 50 may be banded with first 2 inches being coated at 48 g/ft3 and the last 10 inches being coated at 2 g/ft3 for a filter having a length of 12 inches. In this embodiment, the downstream particulate reduction device exhibited a filtration efficiency higher than 85%. In one example operation of the system, the $NO_2/NO_x$ ratio out of the filter on a CAT 3126 engine over FTP cycle was essentially the same as the ratio out of the engine at 8%.

Figure 6A:
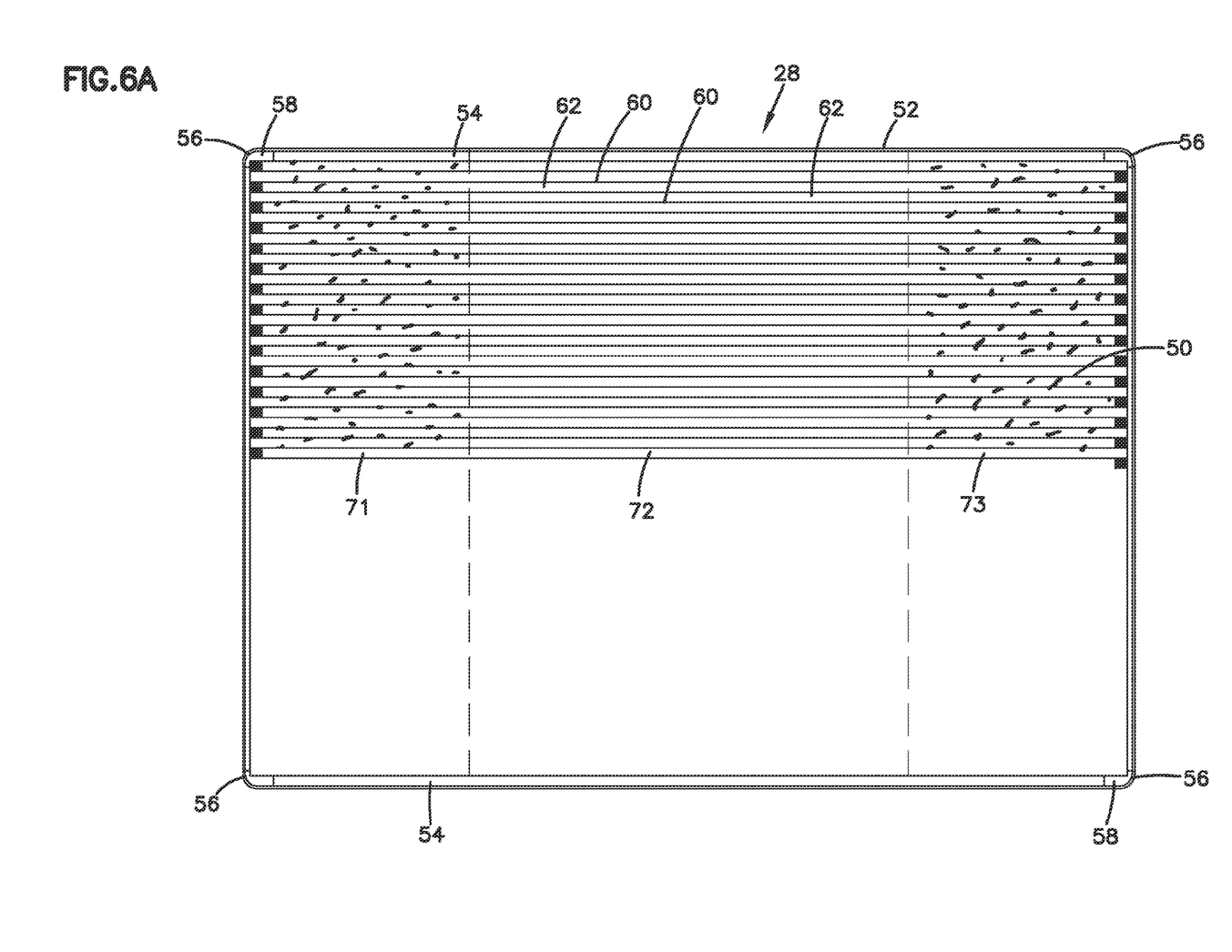
FIG. 6A illustrates the wall flow filter of FIG. 6 coated with a catalyst using a zone-coating technique.

As illustrated in FIG. 6A, in certain embodiments, the downstream device 28 may be zone-coated with a catalyst, wherein the substrate 50 is coated at the ends with a wash coat including a catalyst and is not coated with a wash coat at the middle of the substrate 50. As illustrated in FIG. 6A, first and third zones 71, 73, respectively, are located at the ends of the substrate 50 and are coated with a wash coat. A second, middle zone 72 is positioned between the first and the third zones 71, 73, respectively, and is not coated with a wash coat.

The sizes of the wash coated zones may vary in different embodiments of the filter. For example, in certain embodiments, the first coated zone 71 of the filter 28 may be between about ⅙ and ⅓ of the length of the filter 28 and the third coated zone 73 may be between about ⅙ and ⅓ of the length of the filter 28.

The precious metal loading values may also vary in different embodiments of the filter. In certain embodiments, the precious metal loading of the first zone 71 may be between about 25 and 50 grams/cubic foot and the precious metal loading of the third zone 73 may be between about 5 and 50 grams/cubic foot. In certain embodiments, the overall precious metal loading of the filter 28 may be between about 5 and 35 grams/cubic foot.

In one embodiment, for a filter that is 12 inches in length and 10.5 inches in diameter, the first and the last 3 inches of the device 28 may be wash-coated with a catalyst at a precious metal loading of about 50 grams/cubic foot and the middle 6 inches may be left uncoated. In such an embodiment, the overall precious metal loading of the filter 28 would be around 25 grams/cubic foot.

In another embodiment, the filter 28 may be zone-coated, but with different levels of loading on the coated portions. For example, for a filter that is 12 inches in length and 10.5 inches in diameter, the first (inlet) 3 inches may be wash coated with 50 grams/cubic foot of precious metal loading and the last (outlet) 3 inches may be coated with 10 grams/cubic foot of precious metal loading and the middle 6 inches may be left uncoated. In such an embodiment, the overall precious metal loading of the filter 28 would be around 15 grams/cubic foot.

Further details of zone-coating of catalysts can be found at U.S. Provisional Patent Application Ser. No. 60/835,953, entitled "CRACK RESISTANT SUBSTRATE FOR AN EXHAUST TREATMENT DEVICE", the entire disclosure of which is hereby incorporated by reference.

It should be noted that similar zone-coating techniques for catalysts may be used in the upstream diesel particulate reduction device 26 as well.

The diesel particulate reduction device 28 preferably has a particulate mass reduction efficiency greater than 75%. More preferably, the diesel particulate reduction device 28 has a particulate mass reduction efficiency greater than 85%. Most preferably, the diesel particulate reduction device 28 has a particulate mass reduction efficiency equal to or greater than 90%. It is preferred for the particulate reduction device 28 to have a higher particulate mass reduction efficiency than the particulate reduction device 26. In certain embodiments, the particulate mass reduction efficiency of the device 28 is at least 50, 100, 200, 300, 400 or 500 percent higher than the particulate mass reduction efficiency of the device 26. In other embodiments, the particulate mass reduction efficiency of the device 28 is at least 50-600 or 100-500 or 200-500 percent higher than the particulate mass reduction efficiency of the device 26.

Preferably, to ensure regeneration without excessive $NO_2$ emissions, the ratio of the mass of $NO_2$ to the mass of particulate matter in the exhaust stream between the upstream device 26 and the downstream device 28 is preferably between 8 and 14. More preferably, this ratio is between 8 and 12. In certain embodiments, it is desirable for the concentration of $NO_2$ between the devices 26, 28 to be in the range of 50-700 parts per million. In other embodiments, the ratio of $NO_2$ to total $NO_x$ between the devices 26, 28 is in the range of 20-55 percent or in the range of 30-50 percent. The ratio of $NO_2$ to $NO_x$ can be determined by measuring the total amount of $NO_2$ and the total amount of $NO_x$ in the exhaust stream between the upstream and downstream filters, and the dividing the total $NO_2$ by the total $NO_x$ to obtain a flow weighted average over a given test period. An example test period and engine cycling protocol during testing are set for by the FTP heavy-duty transient cycle that is currently used for emission testing of heavy-duty on-road engines in the United States.

In operation of the system, a first portion of the particulate matter contained in the diesel exhaust is deposited on the first diesel particulate reduction device 26 in an amount that is a function of the particle capture efficiency of the first diesel particulate reduction device 26. The exhaust gas exits the first diesel particulate reduction device 26 containing a residual portion of particulate matter, defined as the amount of particulate matter not deposited on the first diesel particulate reduction device 26. The exhaust gas thereafter enters the second diesel particulate reduction device 28, where a portion of the particulate matter present in the exhaust gas is deposited on the second diesel particulate reduction device 28 according to the particle capture efficiency of the second diesel particulate reduction device 28.

Simultaneously, as the exhaust gases travel through the first diesel particulate reduction device 26, the SOF portion of particulate matter is oxidized by contact with the oxidation catalyst coating. Furthermore, the NO present within the exhaust stream is converted to $NO_2$ by the oxidation catalyst coating within the first diesel particulate reduction device 26. A portion of this $NO_2$, along with the $NO_2$ inherently present in the exhaust gas, reacts with the particulate matter trapped on the first diesel particulate reduction device 26. By the reaction of $NO_2+C=NO+CO$ or $CO_2$, a portion of the particulate matter is oxidized and converted from a solid carbon form to carbon monoxide or carbon dioxide gas, which thereby exits the particulate reduction device. There is insufficient mass of soot, however, trapped on the first diesel particulate reduction device 26 to completely consume the $NO_2$ present in the exhaust stream.

Consequently, the exhaust gas exiting the first diesel particulate reduction device 26 contains a residual portion of $NO_2$. This exhaust gas then enters the second diesel particulate reduction device 28 and the $NO_2$ in the exhaust stream reacts with soot on the device 28, converting a portion of the $NO_2$ into NO and regenerating the device 28. In this way, particulate matter is captured and the particulate reduction devices are regenerated while minimizing $NO_2$ emissions.

Moreover, the preferred design of the particulate reduction devices create significant internal, three-dimensional, turbulent flow patterns by virtue of the highly tortuous, twisted flow vectors that result from flow impacting into the filtration material 30 and being channeled into and out of the openings in the corrugated foil 32. Other flow-through filter designs such as wire mesh or ceramic or metallic foams produce similar favorable internal turbulence. This internal local turbulence increases the interaction of the exhaust gas with the catalytic coating on the filtration substrate material, thereby promoting the conversion of NO to $NO_2$. Furthermore, this turbulence increases the interaction of the $NO_2$ with the particulate matter trapped on the surfaces of the diesel particulate reduction device. In doing so, the design of the diesel particulate reduction device promotes the consumption of $NO_2$ and the regeneration of the particulate filter.

A number of tests were preformed to provide comparative data between an example system in accordance with the principles of the present disclosure and other systems. The systems tested included system A, system B and system C.

System A is an example of system in accordance with the principles of the present disclosure. System A included an Emitec PM Kat flow-through filter positioned upstream from a wall flow filter. The Emitec filter had a platinum loading of about 70 grams per cubic foot while the wall flow filter had a platinum loading of about 50 grams per cubic foot. The Emitec filter had a diameter of 10½ inches and a length of about 3 inches, and the wall flow filter had a diameter of 10½ inches and a length of about 12 inches. The Emitec filter had a particulate mass reduction efficiency less than 50 percent, while the wall flow filter had a particulate mass reduction efficiency greater than 85 percent.

System B was manufactured by Johnson Matthey, Inc. and sold under the name CCRT. The system included a catalytic converter positioned upstream from a catalyzed wall/flow filter.

System C had the same configuration as System A, except the Emitec filter was loaded with a low $NO_2$ producing catalyst sold by Engelhard. The catalyst includes constituents that inhibit the production of $NO_2$, but allow the oxidation of hydrocarbons. The platinum loading for the low $NO_2$ producing catalyst was also 70 grams per cubic foot.

Figure 8:
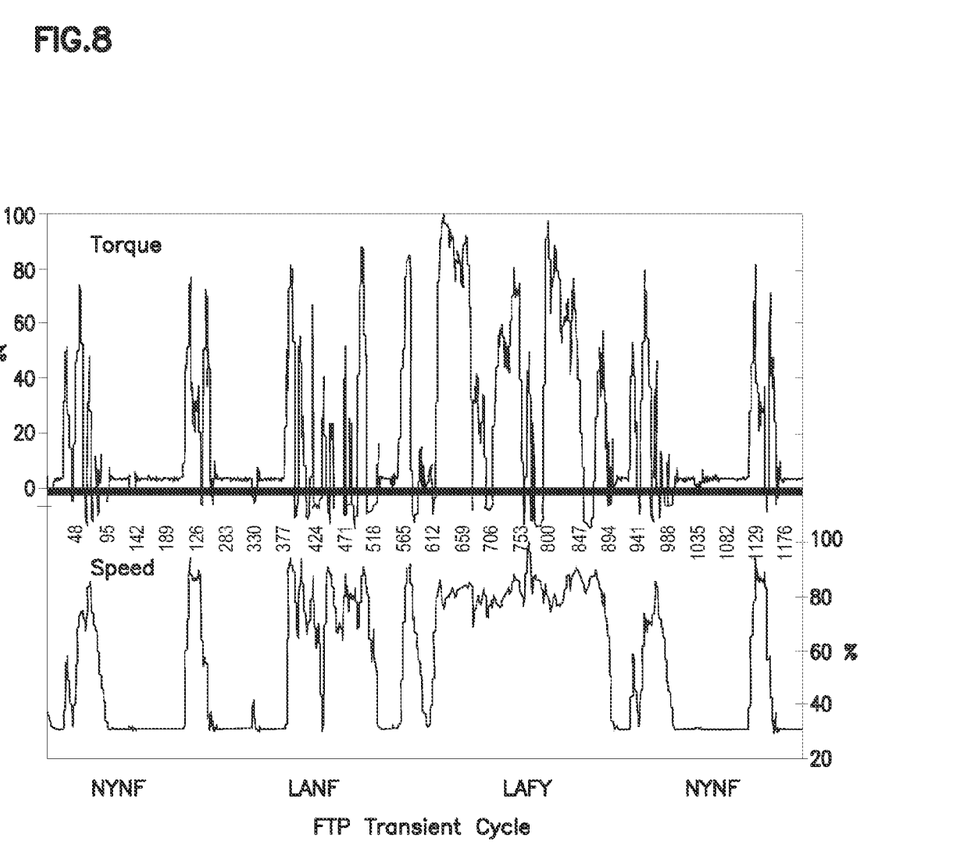
FIG. 8 is a graph showing a FTP transient cycle.

Systems A, B and C were tested using a caterpillar 3126 diesel engine having 210 horsepower at 2200 rotations per minute. During testing, the engine was cycled according to the parameters set forth under standard FTP heavy-duty transient cycling. FIG. 8 shows the FTP transient cycle as a plot of the engine torque and speed over a 20 minute time period. The cycle is divided into 4 phases including the New York Non Freeway (NYNF) phase, the Los Angeles Non Freeway (LANF) phase, the Los Angeles Freeway (LAF) phase and the New York Non Freeway (NYNF) phase.

Figure 9:
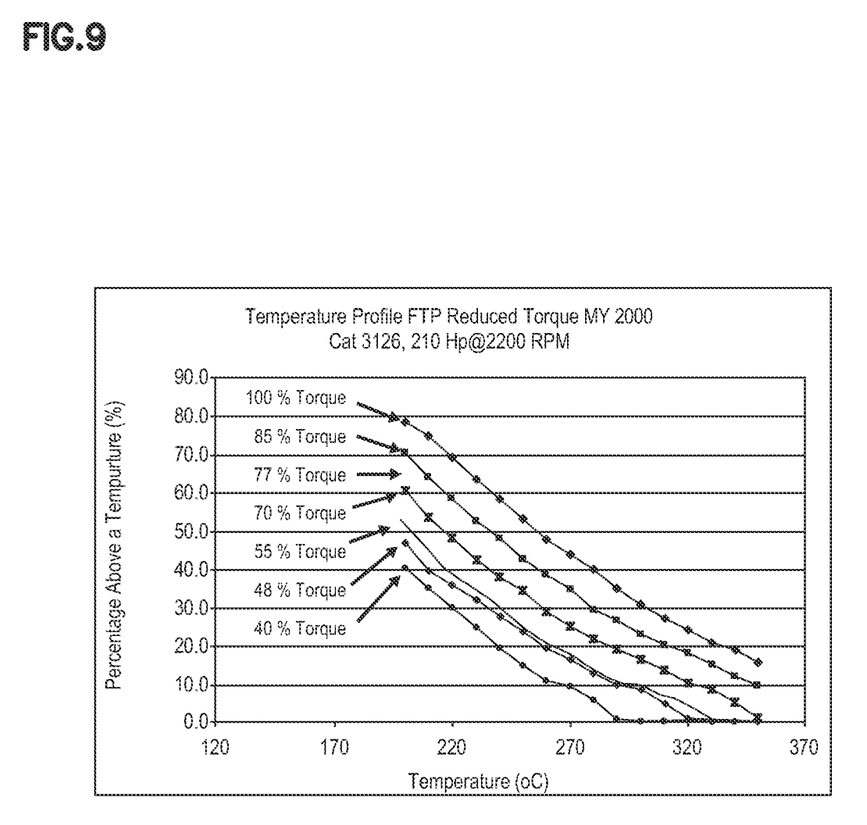
FIG. 9 is a temperature profile graph for a diesel engine for different torque cycling.

FIG. 9 shows temperature profiles for exhaust generated from the caterpillar 3126 diesel engine during FTP transient cycling. The cycling was done at different torque levels. For example, the 100 percent line represents testing done at torque level that match the standard FTP transient cycle shown at FIG. 8. The other profiles were generated by using the same transient cycling, but with the torques lowered a certain percentage relative to the standard torque levels during the federal transient testing protocol. For example, the 85 percent line represents a torque level of 85 percent of the standard torque level specified by the standard FTP transient cycle shown at FIG. 8. Similar plot lines are provided for 77%, 70%, 55%, 48% and 40% of the torque levels set by the standard FTP transient cycle. As shown at the graph of FIG. 9, at 48% torque, the exhaust temperature is above 220° C. for about 37% of the testing duration.

Figure 10:
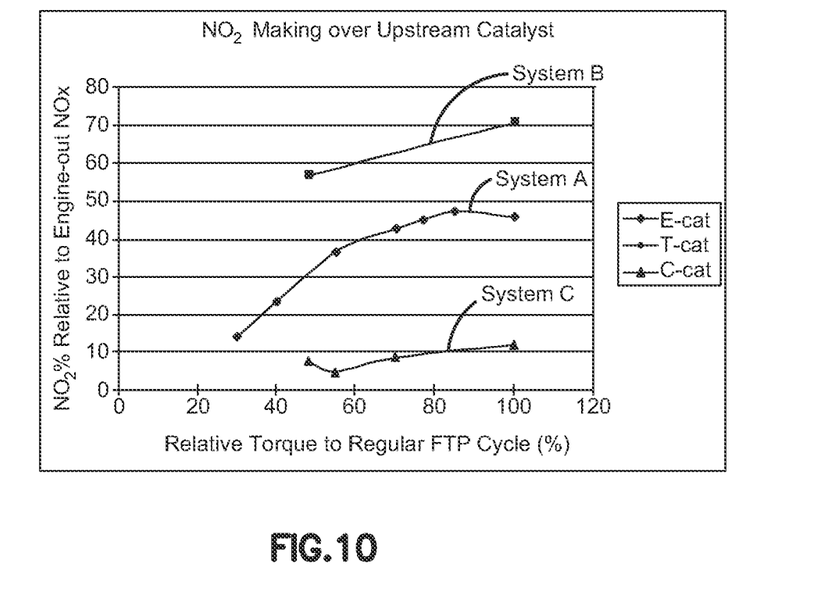
FIG. 10 is a graph that plots $NO_2$ generation for 3 test systems.

During testing, the percentage of $NO_2$ relative to the total $NO_x$ emitted from the engine was measured for each of the systems between the upstream and downstream exhaust treatment devices. FIG. 10 shows the percentage of $NO_2$ relative to total $NO_x$ between the aftertreatment devices for each of the systems. The $NO_2$ to $NO_x$ percentage is shown across the range of torque levels at which the federal transient testing protocol was conducted. The graph of FIG. 10 shows that System A generated moderate levels of $NO_2$ (e.g., generally less than 50%), System B generated relatively high levels of $NO_2$ (e.g., generally greater than 60%) and System C generated relatively low levels of $NO_2$ (e.g., generally less than 10%).

Figure 11:
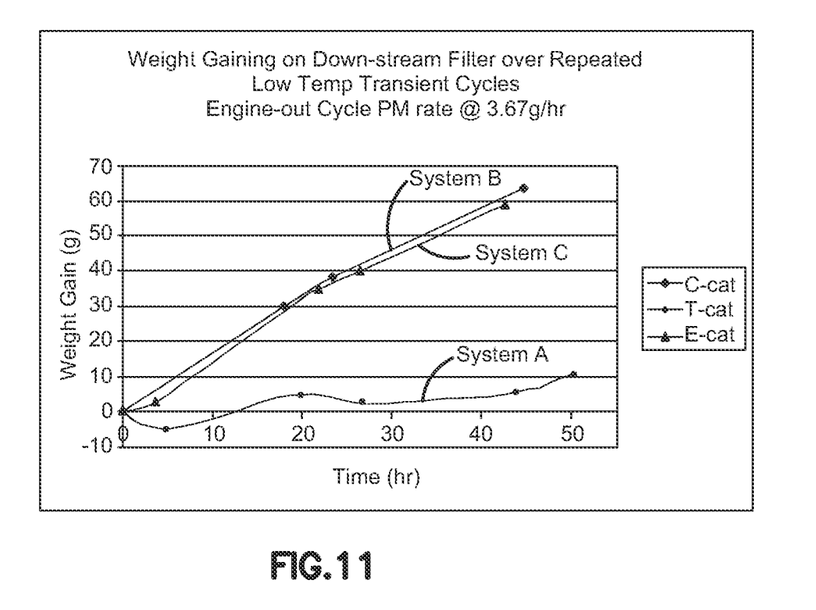
FIG. 11 is a graph that plots particulate accumulation on the downstream filter of the 3 test systems.

FIG. 11 is a graph showing the weight gain on the downstream filters of each of the systems when subjected to federal transient testing protocol cycles at torque levels of 48% for an extended duration. Once again, during testing, a CAT 3126 diesel engine having a 210 horsepower at 2200 RPM was used. During testing, particulate material was emitted from the engine at an average rate of 3.67 grams per hour. As shown by the graph of FIG. 11, System A experienced relatively low weight gain during the testing period. Thus, it can be concluded that a relatively large amount of passive regeneration occurred within the system during the testing period. This regeneration occurred despite the fact that at the 48% torque level, the temperatures of the exhaust gas were relatively low (e.g., the temperature exceeded 220° C. less than 40% of the time and almost never exceeded 300° C. In contrast, both Systems B and C experienced substantial weight gain. This indicates that the combination of optimized upstream filtration and $NO_2$ production has significant advantages over systems that merely provide increased $NO_2$ without upstream filtration, or systems that have upstream filtration without generating $NO_2$.

It will be appreciated that the specific dimensions disclosed herein are examples applicable for certain embodiments in accordance with the principles of the disclosure, but that other embodiments in accordance with this disclosure may or may not include such dimensions.

The invention claimed is:

1. A system for treating diesel exhaust, characterized in that the system comprises:
    a first filter having a particulate mass reduction efficiency in the range of 15-50 percent, the first filter configured to reduce the concentration of hard carbon in the exhaust stream;
    a second filter positioned downstream from the first filter, the second filter having a particulate mass reduction efficiency of at least 75 percent;
    the first and second filters being relatively sized such that in use the space velocity of the first filter is 2-6 times the space velocity of the second filter; and
    the first and second filters each being loaded with a precious metal catalyst, the first filter having an overall higher precious metal loading than the second filter.

2. The system of claim 1, wherein the first filter includes a first substrate having layers of filtration material positioned between layers of corrugated metallic foil, the corrugated metallic foil defining a honeycomb arrangement of longitudinal passageways that extend from an upstream end to a downstream end of the first substrate, the corrugated metallic foil defining openings for allowing exhaust to pass between adjacent longitudinal passageways of the corrugated metallic foil, the filtration material being positioned such that exhaust passing between the adjacent longitudinal passageways passes through the filtration material, the corrugated metallic foil also including flow diverting structures positioned to divert exhaust flow within the longitudinal passageways through the openings.

3. The system of claim 2, wherein the flow diverting structures do not completely block the longitudinal passageways.

4. The system of claim 1, wherein the second filter includes a second substrate defining a honeycomb arrangement of longitudinal passageways that extend from an upstream end to a downstream end of the second substrate, the longitudinal passageways being selectively plugged adjacent upstream and downstream ends of the second substrate such that exhaust flow is forced to flow radially through walls between the longitudinal passageways of the second substrate.

5. The system of claim 2, wherein the filtration material includes fibers, wherein the fibers comprise metallic fibers.

6. The system of claim 1, wherein the first and second filters are relatively sized such that in use the space velocity of the first filter is 3-5 times the space velocity of the second filter.

7. The system of claim 1, wherein the second filter has a particulate mass reduction efficiency of at least 85 percent.

8. The system of claim 1, wherein the first filter has a residence time that is at least 10 percent greater than the residence time of a straight channel flow-through catalytic converter having the same space velocity as the first filter.

9. The system of claim 1, wherein the second filter is zone coated with precious metal and includes a first zone having a first precious metal loading and a second zone having a second precious metal loading, the first precious metal loading being greater than the second precious metal loading.

10. The system of claim 9, wherein the first zone includes a band located at an upstream end of the second filter, and wherein the second zone is located downstream from the first zone.

11. The system of claim 10, wherein the second zone extends from the first zone to a downstream end of the second filter.

12. The system of claim 11, wherein the band has an axial length that is between about 1/6 to 1/3 of a length of the second filter.

13. The system of claim 1, wherein the second filter includes a first zone having a first precious metal loading and a second zone having no precious metal loading.

14. The system of claim 2, wherein the filtration material is configured to capture hard carbon from the exhaust.

15. A method for treating a diesel exhaust stream including NO and particulate matter, the particulate matter including at least a portion that is hard carbon, characterized in that the method uses the system of claim 2, and comprises:
    initially passing the exhaust stream through the first filter, wherein the first filter converts at least some of the NO to $NO_2$ and also removes at least some of the hard carbon from the diesel exhaust stream; and
    subsequently passing the exhaust stream through a wall-flow filter positioned downstream from the first filter, wherein the first filter is designed such that the ratio of the mass of the $NO_2$ and the mass of the particulate matter in the exhaust stream is in the range of 8-14 at a location between the first filter and the wall flow filter.

* * * * *